Nov. 3, 1959 H. N. CROOKS 2,911,621

BIDIRECTIONAL STATIC MAGNETIC STORAGE

Filed June 2, 1952 3 Sheets-Sheet 1

INVENTOR
Horatio N. Crooks
BY Morris A. Rabkin
ATTORNEY

Nov. 3, 1959 H. N. CROOKS 2,911,621

BIDIRECTIONAL STATIC MAGNETIC STORAGE

Filed June 2, 1952 3 Sheets-Sheet 2

INVENTOR
Horatio N. Crooks
BY Morris A. Rabin
ATTORNEY

INVENTOR
Horatio N. Crooks
BY [signature]
ATTORNEY

United States Patent Office 2,911,621

Patented Nov. 3, 1959

2,911,621

BIDIRECTIONAL STATIC MAGNETIC STORAGE

Horatio N. Crooks, Haddonfield, N.J., assignor to Radio Corporation of America, a corporation of Delaware Application June 2, 1952, Serial No. 291,231

18 Claims. (Cl. 340—174)

This invention relates to computers and to a static magnetic storage system therefor; and more particularly to a static magnetic delay line or array in which the direction of transfer of information can be altered or reversed.

Large scale electronic computers use various types of storage or memory devices. These devices provide a temporary or permanent storage of information until required in the computer operations. Among those that have been developed is the static magnetic delay line. The latter type of memory is described in some detail in the following publications: "Magnetic Delay-Line Storage" by An Wang; Proceedings of the I.R.E., volume 39, No. 4, April 1951; "Static Magnetic Memory" by Kincaid et al., Electronics, January 1951.

The static magnetic delay line contains a large number of stationary magnetic elements serially coupled in a line or in an array. The direction of residual magnetism in the magnetic elements or cores provides a convenient medium for storing information encoded in the binary number system. Thus, the positive and negative directions of magnetism in each core may represent an information bit such as "1" and "0." The characteristics of the magnetic cores are such that the residual magnetism does not change unless an opposing magnetizing force is applied to the core. This stable character of the magnetic cores is the result of the hysteresis characteristic of the magnetic material used. As discussed in the publications cited above, the desired hysteresis graph is a substantially rectangular loop. As a result, a magnetomotive force greater than some critical value is required to change the flux density in a magnetic element to a saturation value. With removal of the magnetizing force, the residual magnetism is essentially the same as the saturation value. To reverse the polarity of magnetism, a magnetomotive force in the opposite direction is applied, which force is also greater than the critical value. If a magnetizing force is applied which is less than the critical value, substantially no change in the residual magnetism is produced. Thus, a magnetic core has two states of substantial stability.

The information to be stored may be read into a magnetic core at one end of the delay line. This is done by means of an input coil on the first core and an appropriate signal through the input coil to produce a change of flux in the core. The core is thus magnetized in a direction representative of the information. The direction of magnetism or polarity is transferred serially along the cores as the information is read in. The means for this comprises an output and input coil on each core. The output coil of each core is coupled to the input coil of the succeeding core in the line by a circuit permitting only unidirectional transfer or advance of information from one core to the next. The output coil detects any reversal in magnetic polarity in its core; the change in flux inducing a voltage in the coil. If the resulting current has a direction consistent with that of the coupling circuit, it is transmitted to the input coil of the succeeding core producing a change in magnetic flux and a turnover in polarity of that core.

The means for actuating the transfer or advancing operation comprise advancing coils on each core connected to advancing signal lines. A signal pulse sent through an advancing line changes the polarity of a core connected to the line where its previous condition permits. The change in magnetism is transmitted, as a signal, to the succeeding core, which is, in turn, magnetized with the same polarity that the preceding core had before the change. Thus, information, as represented by the magnetized state of the cores, can be advanced serially along the line in a single direction which is determined by the coupling circuits.

When desired, information can be read out of the delay line by advancing signals. These signals transfer the stored information along the line of cores to the output end where it is removed in the form of representative signals induced in an output coil on the last core. Thus, in the usual delay line the information may be read in at one end of the line and read out at the other end.

The unidirectional transfer characteristic of the coupling circuit in the magnetic delay line described is necessary in order that the transfer operation can be controlled. However, the utility of this type of delay line is limited by the single direction of transfer. Information can only be read into the line at one end and read out at the other end. Likewise, it is difficult to perform any operation on the stored information, such as, to modify it or to use a portion in one way and another portion in a different way in view of the unidirectional transfer limitation.

It would be desirable to provide the static magnetic delay line with a bidirectional mode of operation: A bidirectional delay line would permit entry and removal of information at the same end. Modification of information would be more readily possible, adding versatility to the delay line. For example, the order of a line of information could be reversed by reading it into the delay line at one end and out again at the same end. A reversible or bidirectional magnetic delay line would also permit counting in two directions; thus, the difference between two counts could be found.

It is, therefore, an object of this invention to provide a static magnetic delay line having increased versatility with a relatively small addition in structure.

Another object is to provide a simple delay line having a bidirectional mode of operation.

Still another object is to provide a novel coupling for the magnetic cores of a static magnetic delay line which will permit bidirectional transfer of information along the line.

Yet another object is to provide a novel means for controlling the advance of information bidirectionally along a delay line whereby the order of information may be reversed.

These and other objects of this invention are achieved by coupling each adjacent pair of magnetic cores in a static magnetic delay line with two circuits, each of which performs a transfer operation unidirectionally but in opposite directions. One embodiment of the invention makes use of switches in the transfer circuits which function to activate and deactivate their respective circuits so that a direction of transfer can be selected and quickly changed. In one arrangement, extra input and output coils are provided on each magnetic core to form a second coupling circuit. In another modification, a center tap is provided on each output coil to form the input winding of the oppositely directed circuit, thus, reducing the number of windings needed. In still other modifications, the coupling circuits require only a single output and a single input coil on each core.

In still another embodiment of the invention, forward and reverse transfer paths for a static magnetic delay line are provided by using three series of magnetic cores. Each core of one series is coupled to cores of a second and a third series by unidirectional coupling circuits oriented in opposite directions. A different advancing line is provided for each of the three series of cores. Selection and control of the direction of advance of information is achieved by sending advancing pulses through the first and second series lines and a steady current through the third series line. As a result, the information will advance in the direction determined by the coupling circuits to the second series cores. The steady current blocks any transfer to the third series cores. Switching means is provided for sending the steady current through the second series line and advancing pulses through the third series line in order to reverse the direction of transfer.

The invention may be best understood by reference to the following description and the accompanying drawings in which.

Figure 1:
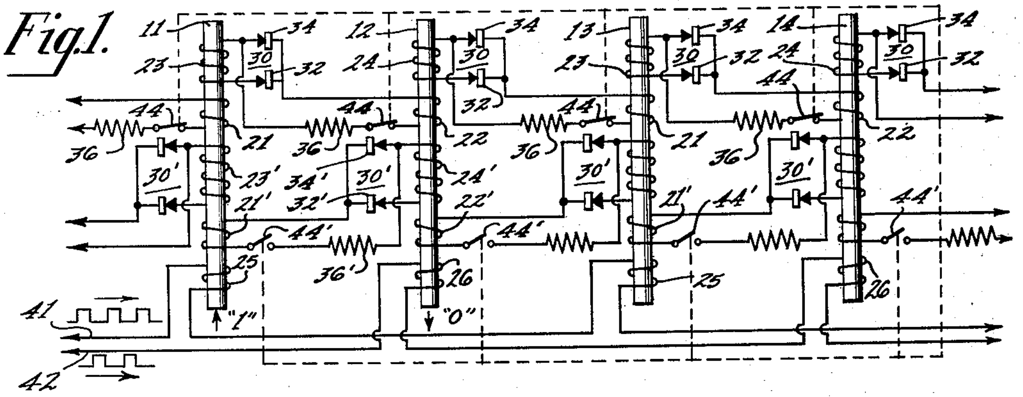
Figure 1 shows diagrammatically a bidirectional static magnetic delay line embodying the invention.

As shown in Figure 1, a static magnetic delay line is formed by a plurality of serially connected magnetic cores 11, 12, 13, 14. Alternate cores have an input coil 21 or 22, an output coil 23 or 24 and an advancing coil 25 or 26. The output coil 23 or 24 of one core is linked to the input coil 22 or 21 respectively, of the succeeding core by an appropriate transfer circuit 30. One rectifier, or unilateral impedance, 32 is placed in series with and another 34 is placed across the leads of the transfer circuits 30 and a resistor 36 is also placed in series with leads in each one of the circuits for a purpose which will be more apparent shortly. A switch 44 is placed in series with each resistor 36. The advancing coils 25 or 26 of alternate cores are connected respectively to one of two advancing lines 41, 42 for receiving advancing current pulses of positive polarity as shown in the drawing. (The second set of coils, associated circuits and switches are described below.)

The delay line operates as follows: Consider the condition where the first core 11 is storing a "1" by means of a positive residual magnetism and the second core 12, a "0" by means of a negative residual magnetism as indicated in Figure 1. If a large positive pulse is applied to the first advancing line 41, the magnetizing force produced by the current in the advancing coil 25 shifts or turns over the polarity of the first core 11 to a negative state. Along with that turnover, the change in flux in the magnetic core induces a large positive voltage in the output winding 23 of the first core. The resulting current in the output winding (assuming switches 44 are closed) flows through the serially connected rectifier 32 and the input coil 22 of the second core 12 and back through the resistor 36, and produces a large magnetizing force in that core 12 changing the polarity from negative to positive. It can be seen that the advancing pulse transfers the digit "1" stored in the first core 11 to the second core 12.

The purpose of the rectifiers 32, 34 is to isolate the transfer from the first core 11 to the second core 12. When the second core 12 is shifted from a negative to a positive polarity, a negative voltage is produced in its output winding 24. However, that voltage does not produce any effect on the input coil of the third core 13, because the resulting current is blocked by the series rectifier 32 operating in a customary way as a unidirectional current path. Thus, the third core 13 is unaffected by the transfer from the first to the second core. At the same time that the transfer is taking place from the first core, a corresponding transfer is taking place from the third core 13 to the fourth core 14 and so on down the line of cores caused by that same advancing pulse applied to the odd-numbered cores through the first line 41. If a core is in a negative state when it receives an advancing pulse, its polarity will not be turned over. Thus, the immediately succeeding core remains unchanged. This in effect produces a transfer of the negative polarity to the succeeding core which is negative to start with.

The effect of a positive advancing pulse in the first line 41 is to transfer all of the digits stored in the odd-numbered cores to the even-numbered cores. In a similar manner, positive pulses through the second advancing line 42 transfer the digits stored in the even-numbered cores to the succeeding odd-numbered cores. The purpose of the shunt rectifier 34 and resistor 36 is as follows: When the second core 12 receives its advancing pulse, a voltage is also induced in its input coil 22. In order to prevent any transfer effect on the previous core 11, a rectifier 34 is shunted across the input coil leads, and the resulting current is short circuited through that rectifier 34 and dissipated in the resistor 36.

The digits are stored in alternate cores of the delay line, e.g. the odd-numbered cores. The succeeding alternate cores, the even-numbered cores, are originally in "0" condition, i.e. negatively polarized, in order that they may receive the digit to be transferred from the preceding core; these function as transfer cores. The first advancing pulse transfers the stored digits, "1" or "0," to the succeeding cores and at the same time zeroes the first set of alternate cores. The second advancing pulse then transfers the digits to the first set of cores one position down the line. Thus, a complete cycle or pair of pulses will transfer each digit stored in one of a pair of cores to the corresponding one of the succeeding pair of cores. It is apparent that during the absence of such advancing pulses, the digits are stored in the cores through the medium of the residual magnetism and a substantially permanent storage is produced.

As indicated, in order to control the direction of transfer from one core to the next, rectifier means are placed in the coupling circuits making them unidirectional. This unidirectional character of the static magnetic delay line limits its utility considerably. The limitation is removed by means of the present invention. The static magnetic delay line is made bidirectional, and the direction of transfer can be readily shifted or reversed.

As shown in Figure 1, a bidirectional characteristic for a static magnetic delay line is provided by a second set of output 23′ and input 21′ coils for each core. Each output coil 23′ is coupled to the input coil 21′ of the preceding core by a circuit 30′ which includes series 32′ and shunt 34′ rectifiers and a resistor 36′ as in the first set of circuits except that the rectifiers are arranged to conduct in the opposite direction. Thus, the direction of transfer along the second set of coupling circuits is the reverse of that along the first set.

Switch means 44, 44′ are connected in each circuit 30, 30' for the purpose of activating the circuits along which the transfer is to take place and for deactivating the others. The switches are ganged and, if desired, may be the contacts of a multiple-contact electromechanical relay which can be actuated by an appropriate instruction signal for operating the relay, and thus, the direction of transfer of information may be controlled. The switches 44 of one set of coupling circuits 30 are arranged to open simultaneously with the closing of the other set of switches 44', which simultaneously puts the one set of circuits 30 in an active condition and the other 30' in an inactive condition. Each set of coupling circuits forms a path for the transfer of information, and it operates in the same manner as in the ordinary delay line. The advancing pulses drive the stored information along an activated transfer path in the same manner as described above.

Since mechanical relays are inherently slow in operation it may be desirable to use electronic switches in any application of the invention in which speed is an important factor. However, the type of switch means used is not material to the invention so long as it permits activation of one transfer path and simultaneous deactivation of the other.

Figure 2:
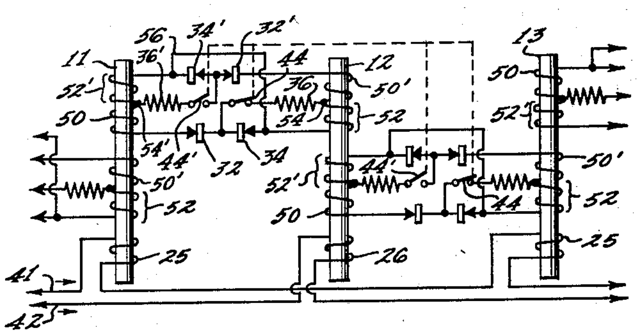
Figure 2 is a circuit diagram of another embodiment of the invention.

Another coupling circuit which permits bidirectional transfer along a static magnetic delay line is shown in Figure 2. As in the previous embodiment, each magnetic core is provided with a pair of output coils 50, 50'. Each output coil has at least a portion of its windings used as an input coil 52, 52' which serves to reduce the number of windings required on each core. This is done by providing a tap 54, 54' on each of the coils of each core. In Figure 2, the windings of the output coil which are used as an input coil have a bracket placed adjacent them. A unidirectional coupling circuit is connected from an output coil 50 or 50' of each core to the tap on one of the coils 50' or 50 of the succeeding core. This succeeding core output coil is in turn coupled to the tap 54 or 54' on the aforementioned output coil of the core preceding it by another unidirectional circuit which conducts in the opposite direction. Each of the circuits, as in the previous embodiment, includes a series 32 or 32' and a shunt 34 or 34' rectifier and a switch 44 or 44'; the polarity of the rectifiers determines the direction of transfer. This arrangement is repeated for the next succeeding core. As a result, each pair of adjacent cores is coupled by a pair of circuits to provide alternative paths of transfer between the two cores. It is apparent from Figure 2, that each pair of circuits has a common lead 56 as well as common windings.

The transfer circuits just described operate in the same manner as in the previous embodiment. When the switches 44 of the first set of circuits are closed and those 44' of the second set are open, transfer of information takes place to the right. Correspondingly, reversal of the condition of the switches reverses the direction of transfer. As previously described, the transfer operation is actuated by pulsing alternate advancing coils 25, 26. With the circuits described, each coil functions either as an output coil or as an input coil depending on whether the switch connected to its tap is open or closed.

Figure 3:
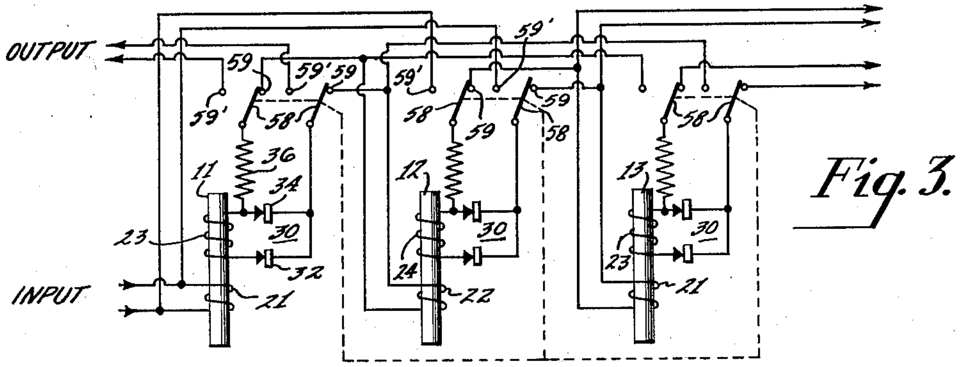
Figure 3 is a circuit diagram of still another embodiment of the invention with the advancing coils omitted to simplify the presentation.

In Figure 3, an alternative arrangement is shown in which only a single set of inputs 21, 22 and output coils 23, 24 are used on each core. As in the embodiment shown in Figure 1, the elements forming the unidirectional circuit 30, the rectifiers 32, 34 and resistor 36, are placed in and across the leads of each output coil 23 or 24. These leads are connected through movable switch contacts 58 and one set of fixed contacts 59 to the leads of the input coil 22 or 21 respectively, of the succeeding core, or alternatively through the other set of fixed switch contacts 59' to the input coil 22 or 21 respectively of the preceding core. Thus, each output coil may be coupled to the succeeding and preceding input coils, and each input coil to the preceding and succeeding output coils. With all the switches 58 simultaneously operated to the right, the transfer circuits leading to the right are activated; with the switches 58 operated to the left, the transfer operation correspondingly takes place to the left.

Switches have been shown in both leads of each coupling circuit. However, since only one lead of the circuit need be broken to deactivate the circuit, half of the switches may be eliminated. The switches may be placed in the leads of the input coils instead of in the leads of the output coils with the same results.

The advancing coils have been omitted from Figure 3 to simplify the drawing. These coils are arranged in the same way as described in connection with the embodiment of the invention shown in Figure 1, and the operation is also the same.

Figure 4:
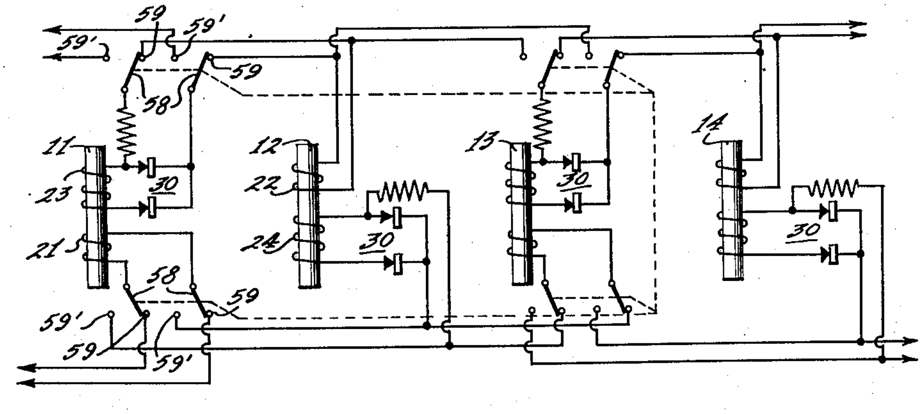
Figure 4 is a circuit diagram of still another embodiment of the invention with the advancing coils omitted to simplify the presentation.

The modification of the invention shown in the circuit diagram of Figure 4 is similar to the one shown in Figure 3. The difference lies in that switches 58 are placed in the leads of the output 23, 24 and input 21, 22 coils of one set of cores 11, 13, and no switches are needed for the coils of alternate cores 12, 14. Advancing coils are used in this embodiment in the same manner as previously described. The operation is also the same.

Figure 5:
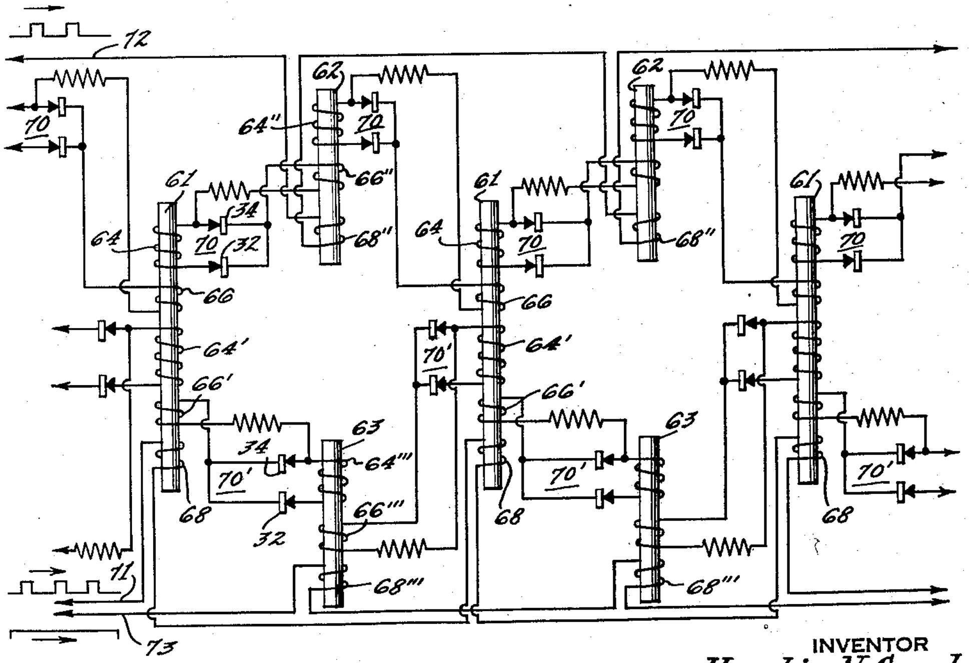
Figure 5 is a circuit diagram of still another embodiment of the invention.

Another embodiment of the invention is shown in Figure 5. In this embodiment each of a first series of cores 61 which function as storage cores is coupled to the succeeding core in that series by means of cores in a second 62 and a third 63 series which function as transfer cores. In this manner, alternative paths for transfer of information are provided. Each of the first series cores has two output 64, 64' and two input 66, 66' coils and one advancing coil 68. Each of the second and third series cores has one output 64'', 64''', one input 66'', 66''' and one advancing coil 68'', 68'''. Unidirectional transfer circuits 70 couple one of the output coils 64 of each first series core 61 with the input coil 66'' of the succeeding second series core 62. The output coil 64'' of the second series core 62 is in turn coupled to one 66 of the input coils of the next first series core 61. The coupling circuits 70 are the same as previously described. These circuits along with the second series cores functioning as transfer cores make up a first transfer path. The direction of transfer is determined by the direction of conduction in the circuits which in turn is determined by the polarity of the rectifiers 32, 34 as previously described.

In a similar manner, a second transfer path is composed of the third series cores and unidirectional circuits 70' coupling the other output 64' and input 66' coils on each first series core and the corresponding input 66''' and output 64''' coils on adjacent third series cores 63. The coupling circuits 70' are the same as those in the first transfer path, except that the rectifiers 32', 34' are connected to have the reverse polarity. Thus, the transfer along the second path is in the opposite direction from that along the first path.

It is readily apparent that control of the direction of transfer may be by means of switches as in the previously described embodiments. The switches may be inserted in the same manner in the circuits constituting the first and second transfer paths. Opening and closing the corresponding sets of switches condition the paths for the changes of transfer described above. However, the switches may be eliminated in this embodiment and replaced by a fast-action control system which is now described Three advancing lines are provided in the embodiment shown in Figure 5: One line 71 is connected to the advancing coils of the first series cores 61, another 72 to the advancing coils of the second series cores 62, and the third 73 to the third series advancing coils.

The direction of information transfer is determined by the type of signal sent through the different advancing lines. If a steady positive current is sent through the third advancing line 73, each of the third series cores 63 is magnetized to a negative condition of saturation and maintained in that condition. If the magnitude of the steady current is sufficiently large, the cores are essentially unaffected by transfer current pulses from the preceding first series cores 61, which tend to change the polarity of the transfer cores. Since the polarity of the third series cores 63 does not change, no current pulses are sent out to the succeeding first series cores 61. Thus, the second transfer path may be considered to be blocked or deactivated for purposes of information transfer. While the third series cores 63 are held idle by a steady current, information transfer can take place along the first path, in the usual manner, by means of current pulses alternately sent through the first and second advancing lines 71, 72. The direction of transfer along the first path is to the right under such circumstances.

In order to reverse the direction of transfer, a steady current is sent through the second advancing line 72 and current pulses are applied alternately to the first 71 and third 73 advancing lines. The second path is thereby placed in an active condition for transfer, and the first path is in an idle condition. Thus, the stored information is transferred to the left.

The steady current which holds a series of cores idle should be in the same direction as the advancing pulses. Under such circumstances, the idle cores are negatively magnetized or zeroed, and in condition to receive information from the first series cores when the direction of transfer is reversed.

The second set of input and output coils on the first series cores in the embodiment of the invention shown in Figure 5 may be eliminated by the use of switches. Thus, the output coil 64 of each first series core may be coupled alternatively to the input coil 66″ of the succeeding second series core or to that 66‴ of the preceding third cores through different switch contacts, in the manner shown in Figure 3. The alternate (even-numbered) cores in that embodiment correspond to a pair of second and third series cores in Figure 5.

Figure 6:
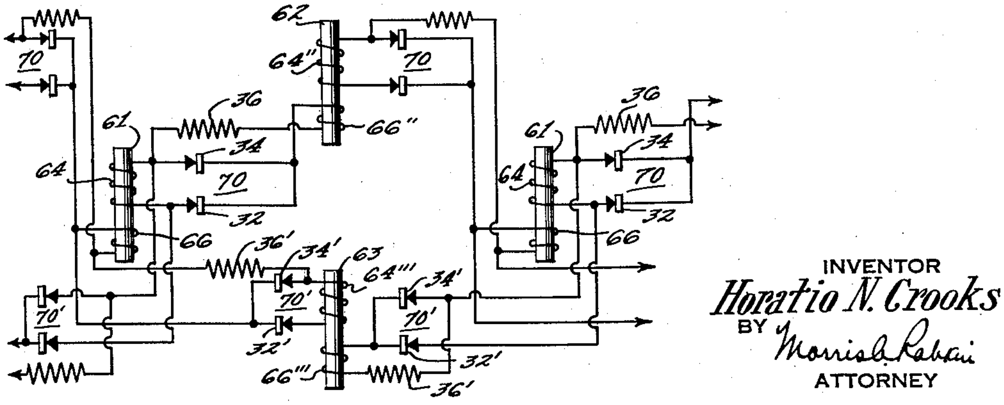
Figure 6 is a circuit diagram of still another embodiment of the invention with the advancing coils omitted to simplify the presentation.

However, as shown in Figure 6, the circuits may be connected to produce the same result without switches. The output coil 64 of each first series core 61 is coupled directly to the input coil 66″ of the succeeding second series core 62 and also to the input coil 66‴ of the preceding third series core 63 by means of unidirectional circuits 70, 70′. The two coupling circuits 70, 70′ are in parallel, and each has the usual rectifiers 32, 34, 32′, 34′ and resistors 36, 36′ in and across its leads. The input coil 66 of each first series core 61 is connected through the usual unidirectional coupling circuits 70, 70′ to the output coil 64″ of the preceding second series core 62 and to that 64‴ of the succeeding third series core 63. Instead of using two circuits 70, 70′ in parallel to couple the output coil 64 of each storage core 61 to the input coils 66″ and 66‴ of the succeeding and preceding transfer cores 62 and 63 respectively, a single circuit may be used with the input coils connected in series in the circuit. Thus, alternative transfer paths are formed for the first series storage cores 61 which are essentially independent although the same coils are used for both. The independence of the transfer paths results from (1) the undirectional nature of the coupling circuits, (2) the fact that no voltage is induced in an output coil unless the polarity of its core changes, and (3) the use of a steady blocking current in one set of advancing coils. With advancing coils and lines arranged as shown in Figure 5, the operation of this embodiment is the same.

Figure 7:
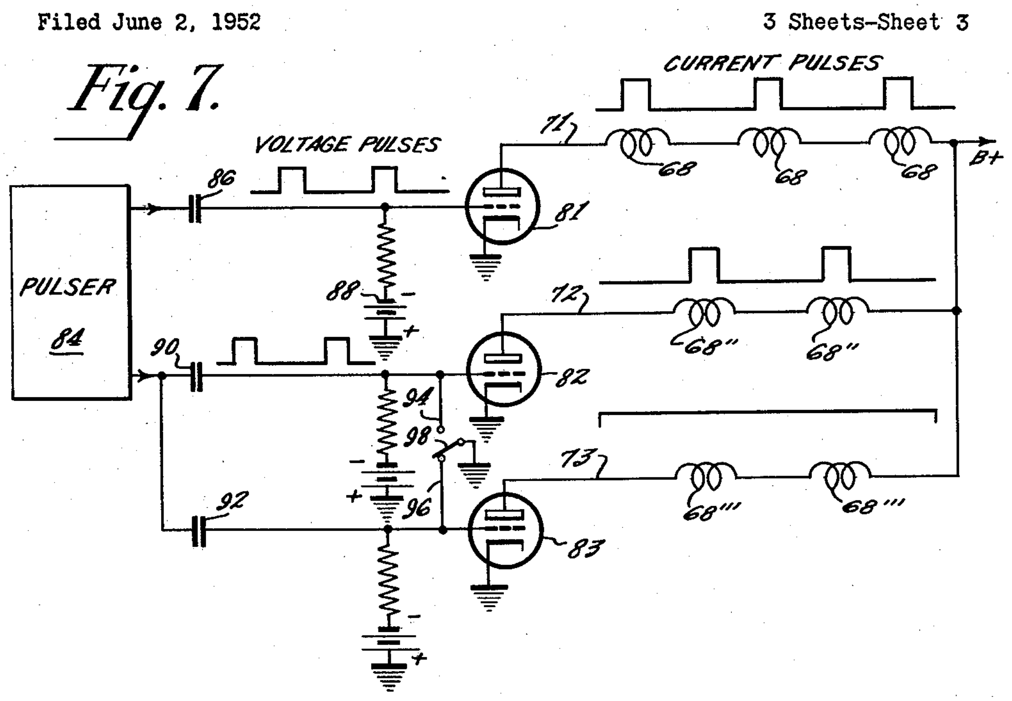
Figure 7 is a circuit diagram of means for controlling the transfer operation in the embodiment of the invention shown in Figure 5.

There is shown in Figure 7 a circuit suitable for directing a steady blocking current into the second 72 and third 73 advancing lines as well as advancing current pulses into all three lines. Three tubes 81, 82, 83 are connected to the two outputs of an ordinary pulser 84. The latter may be arranged in a conventional manner to produce two trains of square-wave voltage pulses, which are time-displaced as shown in Figure 7.

A suitable pulser arrangement (not shown) may comprise a signal generator having its output connected to the primary of a saturable core transformer. The secondary of the transformer is condenser coupled to a pair of one-shot multivibrators in parallel; one of which is arranged to be responsive to the positive peaks of the output from the transformer secondary for producing positive square-wave pulses, and the other to the negative peaks also for producing positive square-wave pulses. Thus, two trains of time-displaced, positive square-wave pulses are produced by the two one-shot multivibrators corresponding to the time-displaced positive and negative wave peaks from the transformer secondary.

One of the pulser outputs is coupled by means of a condenser 86 to the grid of a first tube 81 which may be biased to cut-off potential by a bias source 88. The first advancing line 71 connects the anode of the first tube 81 to a source of operating potential. The first series advancing coils 68, in series in the line, function as an anode load. The positive voltage pulses applied to the grid overcome the grid bias and the tube conducts. Conduction in the tube produces a corresponding train of current pulses in the first advancing line 71.

The other pulser output is connected to the grids of a second 82 and a third 83 tube by coupling condensers 90, 92 in parallel. These tubes may also be biased to cut-off. A second path 94, 96 is provided each of these grids to shunt them to ground. A switch 98 connected to ground is provided for alternatively changing the bias of the grids to a ground potential. The anodes of the second 82 and third 83 tubes are connected to an operating potential by the second 72 and third 73 advancing lines respectively, with the corresponding advancing coils 68″, 68‴ as loads.

Considering the condition shown in the drawing: The switch 98 is operated to open the path 94 to ground of the grid of the second tube 82, and to complete the bias shunt 96 of the third tube 83. The second tube 82 remains negatively biased to cut-off, and the train of positive voltage pulses applied to the grid result in a corresponding train of current pulses in the second advancing line. As the first and second train of voltage pulses are time-displaced, so the corresponding current pulses are time-displaced. The third tube 83, which is continuously biased to conduction through the switch 98, produces a steady current in the third advancing line 73. Reversing the switch 98 changes the type of current flowing in the second 72 and third 73 advancing lines; the second line 72 then has a steady blocking current, and the third line 73 has a pulsating advancing current.

The switch shown may be the contacts of an electromechanical relay which responds to an appropriate instruction signal. For faster operation an electronic switch may be substituted. For example, the output of a bistable multivibrator may be used to control and change the bias potentials at the grids of the second and third tubes.

To summarize the operation of the embodiment shown in Figures 5, 6 and 7: Information may be stored in each of the first series cores 61. The second 62 and third series 63 cores are zeroed. Transfer of information takes place along the first series cores in one direction by means of one transfer path comprising the second series of cores 62 and unidirectional circuits 70 alternately coupling the cores of the first and second series. The transfer operation is actuated by alternately pulsing the cores of the two series in the same manner as in the usual delay line. Similarly, transfer in the opposite direction is produced by means of another transfer path comprising the third series of cores 63 and oppositely directed circuits 70′ alternately coupling the first 61 and third series 63 cores. The direction of transfer is controlled by the type of current applied to the advancing coils 68″, 68‴ of the second and third series cores. A steady positive current serves to maintain the cores in a negative or zeroed condition and thus blocks transfer of information into the cores. If advancing current pulses are applied to the second advancing line 72 and a steady current applied to the third advancing line 73, transfer takes place in one direction as determined by the circuits 70, 70′ coupling the first 61 and second 62 series cores. Switch means 98 serve to interchange the type of current applied to the advancing lines 72, 73. Operation of the switch reverses the direction of transfer by directing a steady blocking current into the second advancing line 72, and advancing current pulses to the third advancing line 73.

One of the applications of the bidirectional static magnetic delay line lies in its ability to reverse the order of a message or set of information. A reversal of information may be desirable in various auxiliary operations. For example, the information stored on magnetic tapes may have to be used repeatedly many times. The tapes are rewound after each run which results in a wasted operation and loss of time. By means of the bidirectional static magnetic delay line the wasted operation is eliminated: The information can be taken off the tapes and read into the delay line in reverse order during the rewind operation and then read out in the original order.

Figure 8:
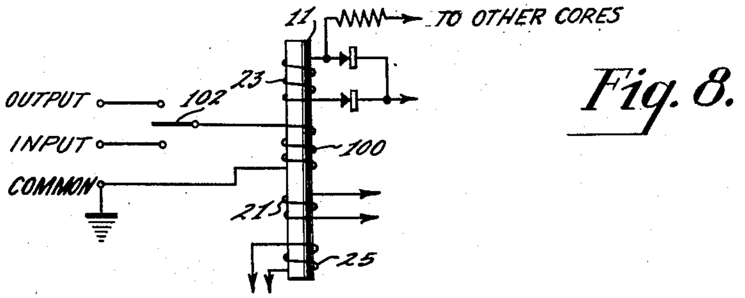
Figure 8 is a diagram of an input-output circuit for a bidirectional delay line.
Figure 9:
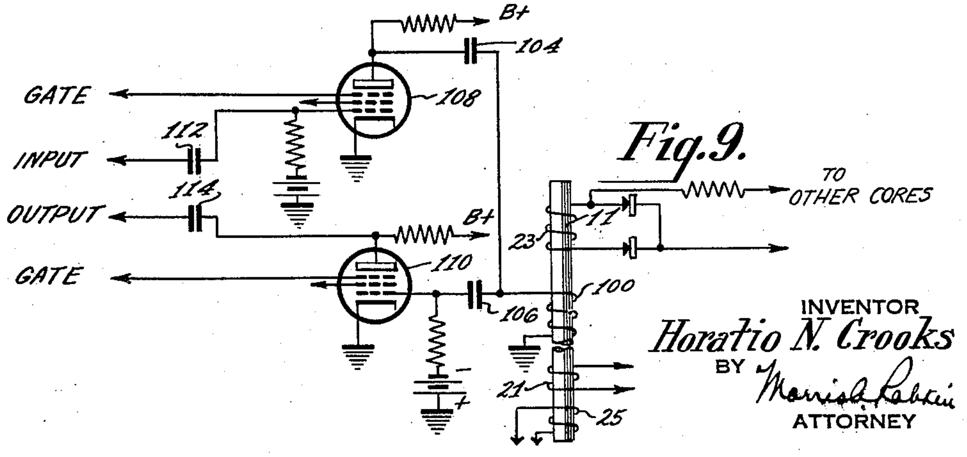
Figure 9 is another diagram of an input-output circuit.

Suitable output and input circuits for reversing the order of information by means of a bidirectional static magnetic delay line are shown in Figures 8 and 9. In Figure 8, a single magnetic core 11 is shown which may be the end core of any of the embodiments shown in Figures 1, 2 and 5. A single coil 100 is used for both input and output in place of one of the sets of input and output coils shown in the aforementioned embodiments. One end of the coil is connected to a common line, and the other end is connected to a switch 102. The fixed contacts of the switch are connected to input and output lines. This switch may be formed as another set of contacts of the electromechanical relays utilized in the previously described embodiments. In that way, the appropriate output or input line is connected to the delay line as the corresponding path of information transfer is activated by the switches in the embodiments of the invention shown in Figures 1, 2 and 3.

The order of information may be reversed in the following manner: The input line is connected through the switch 102 to the input-output coil 100 on the end core; and the path transferring information away from the core is activated simultaneously. As each information bit is pulsed into the first core 11, the advancing coils 26 of the even-numbered cores are pulsed. This zeroes the second core 12 preparing it to receive the bit read into the first core 11. Then the odd-numbered cores receive an advancing pulse which transfers the information down the line. This cycle is repeated until all of the information is entered in the delay line. The switches are then reversed: The input-output coil 100 is connected to the output line, and the oppositely-directed transfer path is activated. Advancing pulses are applied to the advancing lines and the information is read out. For each "1" stored in the delay line a pair of positive and negative pulses are sent out. They are produced by the voltages induced in the input-output coil with the transfer of a "1" into the end core and by the zeroing of that core by its advancing pulse. A "0" is represented by the absence of pulses due to the end core remaining zeroed during the application of a pair of advancing pulses to the delay line. Due to the fact that the magnetic material may not follow an ideal, squared hysteresis loop, the residual magnetism in the cores may not be at full saturation. In such a case, a "0" is read out as a pair of very small pulses.

Figure 3 shows an arrangement for coupling the input and output lines to the input and output coils of an end core where but one set of input and output coils are used. Alternatively, a coil could be used for both input and output as shown in Figure 8.

In Figure 9, an alternative input-output circuit is shown in which electronic switching is used. One end of the input-output coil 100 is coupled, by means of condensers 104, 106 in parallel, to the anode of a first pentode tube 108 and to the negatively-biased first control grid of a second pentode tube 110. The input line is condenser-coupled 112 to the negatively-biased first control grid of the first tube 108; the output line is condenser-coupled 114 to the anode of the second tube 110. Switching is provided by connecting the second control grids of the tubes to a gating circuit. The gate may be a bistable multivibrator that responds to an instruction signal and applies ground and negative potentials to the second control grids of the tubes. The tubes are thereby conditioned to conduct and to stop conducting respectively, depending on whether information is to be read into or out of the delay line.

This circuit is especially suited for use with the embodiment of the invention shown in Figures 5, 6 and 7. An electronic switch can activate the appropriate transfer path simultaneously with conditioning the input 108 or output 110 tube for conduction. Information is read into and out of the delay line in essentially the same manner as in the Figure 8 embodiment. With a gating voltage applied to the second control grid of the input tube 108, the input signals applied to the control grid result in representative pulses in the input-output coil 100. Likewise, with a gating voltage applied to the suppressor grid of the output tube 110, pulses and the absence of pulses in the input-output coil 100 result in representative signals in the output line. The magnitude and type of control grid bias depends on the form of ouput signals that are desired.

Another possible application of the disclosed bi-direction static magnetic delay line is as a counter or comparator. The difference between two different counts can be represented by the change in position of information stored in the delay line. For example, a "1" may be stored in one of the first series cores of the Figure 5 and Figure 7 embodiment. A pair of advancing pulses may be applied to the first and second advancing lines 71, 72 for each one of a first count, and a pair of pulses applied to the first 71 and third 73 lines for each one of a second count along with blocking signals for the series of idle cores. The stored "1" is transferred back and forth along the delay line in response to the pulses. The difference between its original position and final position represents the difference between the counts. This may also be done with the other embodiments in which the count signals open and close the appropriate switches as well as apply advancing pulses to the cores.

To summarize the various embodiments of a bidirectional static magnetic delay line disclosed above: Each embodiment has two paths coupling the cores in the delay line for transferring information along the delay line in either of two directions. In the embodiments shown in Figures 1, 2, 3 and 4, control of the direction of transfer is by means of switches in each of the coupling paths. The switches in each path serve to block and unblock the path for the transferring operation when they are open and closed respectively. The paths in these embodiments include coupling circuits of the same type as in the usual static magnetic delay line. The information is stored in one set of alternate cores, while the other cores of the series hold the information temporarily during each advancing cycle. The advancing cycle consists of pulsing the sets of alternate cores through a pair of advancing lines. In the embodiment of Figures 5, 6 and 7, an additional series of cores is provided. The information is stored in each core of a first series; and second and third series of cores are used alternatively to hold the information during each advancing cycle. The second and third series of cores and their coupling circuits provide alternative and oppositely directed transfer paths. A separate advancing line is coupled to each series of cores. Control of the direction of transfer is by means of the type of signal current sent through the advancing lines of the second and third series. Switch means direct a steady, blocking current to one of the latter advancing lines to deactivate the associated transfer path, and advancing pulses to the other line to activate its associated transfer path.

The novel delay-line couplings and control devices are not limited in their utility to reversing the direction of transfer in a single delay line. They may also be used to couple a plurality of delay lines arranged transversely to each other. For example, a series of delay lines is constructed with the cores of each coupled by one unidirectional transfer path of the types disclosed, and a second series of delay lines arranged transversely to the first is formed from the same set of cores and has the cores of each delay line coupled by a second unidirectional transfer path of the same type. The direction of transfer can be switched to take place along the first or second delay lines by activating and deactivating the appropriate transfer paths as disclosed above. This arrangement is more completely disclosed in my patent application, Serial No. 291,232, entitled "Static Magnetic Delay Line," filed June 2, 1952.

It is evident that there has been provided a simple static magnetic delay line that operates bidirectionally. The utility of a delay line has been increased with a relatively small addition in structure. By means of various novel couplings for the magnetic cores of a delay line, the transfer of information in opposite directions may be controlled to reverse the order of a set of information.

What is claimed is:

1. A bidirectional static magnetic storage comprising a plurality of magnetic storage cores operationally arranged in series for storing information, the number of said storage cores being greater than two, each of said cores having an input winding and an output winding, means for coupling said output winding of each of said cores to said input winding of the succeeding core for transfer of information in a first direction and for coupling said output winding of each of said cores to said input winding of the preceding core for transfer of information in a second direction, said coupling means including unidirectional current path means for transmitting currents in each of said output windings to said input windings of the preceding and succeeding cores, input means at one end of said series for reading in signals representative of the information to be stored, means for advancing said stored information in said first direction from said one end, means for reversing said direction of information transfer to said second direction, and output means at said one end for receiving signals representative of said stored information.

2. A static magnetic delay line comprising a plurality of magnetic storage cores operationally arranged in series, at least one output coil linked to each of said cores, a tap for each of said coils defining a portion of each coil as an input winding, a signal transferring circuit coupling each of said output coils with an input winding linked to a succeeding core in said series, each said circuit comprising unidirectional means connected in circuit with said tap defining the associated input winding.

3. A bidirectional static magnetic delay line comprising a plurality of magnetic storage cores, operationally arranged in series, a pair of output coils linked to each of said cores, a tap for each of said coils, a pair of circuits linking one of said coils of each of said cores with one of said coils of the succeeding core in said series, each of said circuits comprising unidirectional means connected in circuit with said tap for one of said coils.

4. A magnetic system comprising a plurality of magnetic elements, a separate output winding linked to each of said magnetic elements, a separate input winding linked to each of said magnetic elements, unidirectional current path means coupling the output winding of a first one of said elements to the input winding of a second one of said elements and to the input winding of a third one of said elements, said unidirectional path means including separate circuit means for transmitting currents in said first element output winding to said second element input winding and to said third element input winding only when the flux direction in said first element changes in a predetermined direction, and means for changing the flux direction in said first element.

5. A magnetic system comprising a plurality of magnetic elements, a separate output winding linked to each of said magnetic elements, a separate input winding linked to each of said magnetic elements, unidirectional current path means coupling the output winding of a first one of said elements to the input winding of a second one of said elements and to the input winding of a third one of said elements, said unidirectional path means including means for selectively transmitting currents in said first element output winding to said second element input winding and to said third element input winding only when the flux direction in said first element changes in a predetermined direction, and means for changing the flux direction in said first element, said unidirectional path means further including switch means for alternatively coupling said first element output winding to said second element input winding and to said third element input winding.

6. A magnetic system comprising a plurality of magnetic elements, a separate output winding linked to each of said magnetic elements, a separatc input winding linked to each of said magnetic elements, unidirectional current path means coupling the output winding of a first one of said elements to the input winding of a second one of said elements and to the input winding of a third one of said elements, said underectional path means including means for selectively transmitting currents in said first element output winding to said second element input winding and to said third element input winding only when the flux direction in said first element changes in a predetermined direction, and means for changing the flux direction in said first element, said means for transmitting currents including a unilateral impedance, and said unilateral path means further including switch means for alternatively coupling said unilateral impedance to said second element input winding and to said third element input winding.

7. A magnetic system comprising a plurality of magnetic elements, a separate output winding linked to each of said magnetic elements, a separate input winding linked to each of said magnetic elements, unidirectional current path means coupling the output winding of a first one of said elements to the input winding of a second one of said elements and to the input winding of a third one of said elements, said unidirectional path means including means for selectively transmitting currents in said first element output winding to said second element input winding and to said third element input winding only when the flux direction in said first element changes in a predetermined direction, and means for changing the flux direction in said first element, said means for transmitting currents including separate unilateral impedances respectively coupled between said first element output winding and said second and third element input windings.

8. A magnetic system comprising a plurality of magnetic elements, a separate output winding linked to each of said magnetic elements, a separate input winding linked to each of said magnetic elements, unidirectional current path means coupling the output winding of a first one of said elements to the input winding of a second one of said elements and to the input winding of a third one of said elements, said unidirectional path means including means for selectively transmitting currents in said first element output winding to said second element input winding and to said third element input winding only when the flux direction in said first element changes in a predetermined direction, means for changing the flux direction in said first element, and additional unidirectional current path means coupling the output winding of a fourth one of said magnetic elements to the input winding of said first element, and coupling the output winding of a fifth one of said magnetic elements to said first element input winding.

9. A magnetic system comprising a plurality of magnetic elements, a separate output winding linked to each of said magnetic elements, a separate input winding linked to each of said magnetic elements, unidirectional current path means coupling the output winding of a first one of said elements to the input winding of a second one of said elements and to the input winding of a third one of said elements, said unidirectional path means including means for selectively transmitting currents in said first element output winding to said second element input winding and to said third element input winding only when the flux direction in said first element changes in a predetermined direction, and means for changing the flux direction in said first element, said means for changing the flux direction in said first element including means for simultaneously changing the flux direction in said second and fourth elements and for simultaneously changing the flux direction in said third and fifth elements.

10. A bidirectional static magnetic storage comprising a plurality of magnetic elements operationally arranged in series, a separate output winding linked to each of said magnetic elements, a separate input winding linked to each of said magnetic elements, unidirectional path means for transfer of information alternatively from one of said magnetic elements to the magnetic elements next preceding and next succeeding said one element in said series, said unidirectional path means coupling said one core output winding to said preceding core input winding and said one core output winding to said succeeding core input winding for transmitting currents in said one core output winding to said preceding core input winding and to said succeeding core input winding.

11. A bidirectional static magnetic storage comprising a plurality of magnetic storage cores operationally arranged in series for storing information, the number of said storage cores being greater than two, each of said cores having an input winding and an output winding, means for coupling said output winding of each of said cores to said input winding of the succeeding core for transfer of information in a first direction and for coupling said output winding of each of said cores to said input winding of the preceding core for transfer of information in a second direction, said coupling means including unidirectional current path means for transmitting currents in each of said output windings to said input windings of the preceding and succeeding cores, input means at one end of said series for reading in signals representative of the information to be stored, means for advancing said stored information in said first direction from said one end, means for reversing said direction of information transfer to said second direction, output means at said one end for receiving signals representative of said stored information, and a common input-output winding linked to the one of said magnetic cores at said one end of said series, said input and output means including a pair of electron control devices, each of said devices having an anode and two control electrodes, gating means coupled to one of the control electrodes of each of said devices, an input line coupled to the other control electrode of one of said devices, an output line coupled to the anode of the other of said devices, and means for coupling the anode of said one device and the other control electrode of said other device to said common input-output winding linked to the magnetic core at said one end of said series.

12. A bidirectional static magnetic storage comprising a plurality of magnetic storage cores operationally arranged in series for storing information, the number of said storage cores being greater than two, each of said cores having an input winding and an output winding, means for coupling said output winding of each of said cores to said input winding of the succeeding core for transfer of information in a first direction and for coupling said output winding of each of said cores to said input winding of the preceding core for transfer of information in a second direction, said coupling means including unidirectional current path means for transmitting currents in each of said output windings to said input windings of the preceding and succeeding cores, input means at one end of said series for reading in signals representative of the information to be stored, means for advancing said stored information in said first direction from said one end, means for reversing said direction of information transfer to said second direction, output means at said one end for receiving signals representative of said stored information, and a common input-output winding linked to the one of said magnetic cores at said one end of said series, said input and output means including a pair of electron control devices, each of said devices having an anode and two control electrodes, gating means coupled to one of the control electrodes of each of said devices, an input line coupled to the other control electrode of one of said devices, an output line coupled to the anode of the other of said devices, and means for coupling the anode of said one device and the other control electrode of said other device to said common input-output winding linked to the magnetic core at said one end of said series, said means for coupling said output winding of each of said cores to said succeeding and preceding core input windings including a switch for alternatively connecting said output winding to said succeeding and preceding core input windings.

13. A bidirectional static magnetic storage comprising a plurality of magnetic storage cores operationally arranged in series for storing information, the number of said storage cores being greater than two, each of said cores having an input winding and an output winding, means for coupling said output winding of each of said cores to said input winding of the succeeding core for transfer of information in a first direction and for coupling said output winding of each of said cores to said input winding of the preceding core for transfer of information in a second direction, said coupling means including unidirectional current path means for transmitting currents in each of said output windings to said input windings of the preceding and succeeding cores, input means at one end of said series for reading in signals representative of the information to be stored, means for advancing said stored information in said first direction from said one end, means for reversing said direction of information transfer to said second direction, output means at said one end for receiving signals representative of said stored information, and a common input-output winding linked to the one of said magnetic cores at said one end of said series, said input and output means including a pair of electron control devices, each of said devices having an anode and two control electrodes, gating means coupled to one of the control electrodes of each of said devices, an input line coupled to the other control electrode of one of said devices, an output line coupled to the anode of the other of said devices, and means for coupling the anode of said one device and the other control electrode of said other device to said common input-output winding linked to the magnetic core at said one end of said series, said means for coupling said output winding of each of said cores to said succeeding and preceding core input windings including separate parallel circuit connections from said output winding to said succeeding and preceding core input windings.

14. A bidirectional static magnetic storage comprising at least three magnetic storage cores operationally arranged in series for storing information, separate input and output windings linked to said cores, means for coupling said output windings of succeeding and preceding cores for alternative transfer of information in opposite directions along said core series, input and output means at one end of said series for reading into said core series signals representative of information to be stored and for receiving from said core series signals representative of the stored information, means for advancing said stored information in one direction from said one end and in the reverse direction back to said one end, and a common input-output winding linked to the one of said magnetic cores at said one end of said series, said input and output means including two electron control devices, each of said devices having output and control electrode means, an input circuit and gating means coupled to the control electrode means of one of said devices, said gating means and said input-output winding being coupled to said control electrode means of the other of said devices, an output circuit coupled to the output electrode means of said other device, and said input-output winding being coupled to said output electrode means of said one device.

15. A bidirectional static magnetic storage comprising a plurality of magnetic storage cores operationally arranged in series for storing information, the number of said storage cores being greater than two, each of said cores having an input winding and an output winding, means for coupling said output winding of each of said cores to said input winding of the succeeding core for transfer of information in a first direction and for coupling said output winding of each of said cores to said input winding of the preceding core for transfer of information in a second direction, said coupling means including unidirectional current path means for transmitting currents in each of said output windings to said input windings of the preceding and succeeding cores, and an additional magnetic storage core operationally arranged to be at one end of said series and having input and output windings respectively coupled to said output and input windings of a first one of said series of cores, said additional core having an input-output winding, input means at said one end of said series for reading in signals to said input-output winding representative of the information to be stored, means for advancing said stored information in said first direction from said one end, means for reversing said direction of information transfer to said second direction, and output means at said one end for receiving signals from input-output winding representative of said stored information.

16. A bidirectional magnetic system comprising a plurality of magnetic elements operationally arranged as a first, second, third, fourth, and so on, in a series, each of said elements having two stable magnetic states, an output and an input winding linked to each of said magnetic elements, a unidirectional circuit for coupling said output winding of said first element to the input winding of said second element, and additional unidirectional coupling circuits each including switch means for alternatively coupling said output winding of said second element to said input windings of said first and third elements and for alternatively coupling said output winding of said third element to said input windings of said second and fourth elements, and so on, each of said coupling circuits being arranged to transfer currents in the associated output winding to the coupled input winding.

17. A bidirectional magnetic circuit comprising a plurality of magnetic storage elements, a coil linked to each of said elements, a tap for each of said coils, and a different unidirectional circuit means coupling each of said coils to a portion of another coil defined by the tap thereof.

18. A bidirectional magnetic system comprising a plurality of magnetic elements operationally arranged as a first, second, third, fourth, and so on, in series, each of said elements having two stable magnetic states, a winding linked to said first magnetic element, first and second windings linked to each of said magnetic elements, unidirectional circuits for coupling said winding of said first element and said first winding of said second element for transferring alternatively signals in opposite directions therebetween, and additional unidirectional coupling circuits for coupling said second winding of said second element to said second winding of said third element and for coupling said first winding of said third element to said first winding of said fourth elements, and so on, for transferring alternatively signals in opposite directions therebetween, each of said unidirectional coupling circuits including switch means for selectively controlling the alternative direction of transfer whereby each of said windings is an output winding for one direction of transfer and an input winding for the other direction, each of said unidirectional coupling circuits being arranged to transfer currents induced in the associated winding operating as an output winding to the associated winding operating as an input winding.

References Cited in the file of this patent

UNITED STATES PATENTS

| | | |
|---|---|---|
| 2,519,513 | Thompson | Aug. 22, 1950 |
| 2,574,438 | Rossi | Nov. 6, 1951 |
| 2,591,406 | Carter | Apr. 1, 1952 |
| 2,708,722 | An Wang | May 17, 1955 |
| 2,729,807 | Paivinen | Jan. 3, 1956 |
| 2,831,150 | Wright et al. | Apr. 15, 1958 |

OTHER REFERENCES

An Wang: "Static Magnetic Storage and Delay Line," pp. 49–54, vol. 21, "Journal of Applied Physics," January 1950.

An Wang: "Magnetic Triggers," pp. 626–632, vol. 38, "Proceedings of the I.R.E.," June 1950.

Thesis by M. K. Haynes, pp. 33–35, 46–50, 57–58 Dec. 28, 1950.